United States Patent
Liang

(10) Patent No.: US 8,422,213 B2
(45) Date of Patent: Apr. 16, 2013

(54) SLIDER ELECTRONIC DEVICE

(75) Inventor: Jen-Yu Liang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 287 days.

(21) Appl. No.: 12/948,733

(22) Filed: Nov. 17, 2010

(65) Prior Publication Data

US 2012/0026652 A1 Feb. 2, 2012

(30) Foreign Application Priority Data

Jul. 30, 2010 (CN) .......................... 2010 2 0277050

(51) Int. Cl.
*G06F 1/16* (2006.01)
*H05K 5/00* (2006.01)
*H05K 7/00* (2006.01)
*H04M 1/00* (2006.01)

(52) U.S. Cl.
USPC ................. 361/679.26; 361/679.3; 455/575.3

(58) Field of Classification Search .. 361/679.26–679.3, 361/679.55, 679.56; 455/575.1–575.4
See application file for complete search history.

(56) References Cited

U.S. PATENT DOCUMENTS

| | | | | | |
|---|---|---|---|---|---|
| 5,085,394 | A | * | 2/1992 | Torii .............................. | 248/455 |
| 5,168,426 | A | * | 12/1992 | Hoving et al. ............ | 361/679.09 |
| 5,548,478 | A | * | 8/1996 | Kumar et al. ............ | 361/679.27 |
| 5,644,469 | A | * | 7/1997 | Shioya et al. ............ | 361/679.06 |
| 6,351,372 | B1 | * | 2/2002 | Kim .......................... | 361/679.15 |
| 6,483,445 | B1 | * | 11/2002 | England ..................... | 341/22 |
| 6,862,171 | B1 | * | 3/2005 | Maskatia et al. .......... | 361/679.06 |
| 6,903,927 | B2 | * | 6/2005 | Anlauff ..................... | 361/679.28 |
| 7,068,497 | B2 | * | 6/2006 | Chu .......................... | 361/679.06 |
| 7,158,634 | B2 | * | 1/2007 | Eromaki .................. | 379/433.13 |
| 7,239,505 | B2 | * | 7/2007 | Keely et al. .............. | 361/679.09 |
| 7,257,432 | B2 | * | 8/2007 | Nan ........................... | 455/575.4 |
| 7,278,184 | B2 | * | 10/2007 | Kuramochi .................... | 16/357 |
| 7,574,243 | B2 | * | 8/2009 | Lee ........................... | 455/575.4 |
| 7,583,496 | B2 | * | 9/2009 | Lai ............................ | 361/679.3 |
| 7,646,866 | B2 | * | 1/2010 | Lin et al. ................... | 379/433.12 |
| 7,653,422 | B2 | * | 1/2010 | Roberts ..................... | 455/575.4 |
| 7,725,988 | B2 | * | 6/2010 | Kim et al. ..................... | 16/361 |
| 7,907,393 | B2 | * | 3/2011 | Sellers ...................... | 361/679.27 |
| 8,199,475 | B2 | * | 6/2012 | Yeh et al. .................. | 361/679.27 |
| 2003/0109230 | A1 | * | 6/2003 | Duarte et al. ................. | 455/90 |
| 2004/0062000 | A1 | * | 4/2004 | Duarte ......................... | 361/683 |
| 2004/0114315 | A1 | * | 6/2004 | Anlauff ....................... | 361/681 |
| 2006/0137141 | A1 | * | 6/2006 | Kuramochi ..................... | 16/330 |
| 2006/0229115 | A1 | * | 10/2006 | Puranen ..................... | 455/575.1 |
| 2006/0256960 | A1 | * | 11/2006 | Bae et al. .................... | 379/433.11 |
| 2006/0293094 | A1 | * | 12/2006 | Kilpi et al. ................. | 455/575.3 |
| 2007/0105606 | A1 | * | 5/2007 | Yoon et al. ................. | 455/575.4 |
| 2007/0217135 | A1 | * | 9/2007 | Chuang et al. ............... | 361/681 |

(Continued)

*Primary Examiner* — Adrian S Wilson
(74) *Attorney, Agent, or Firm* — Altis Law Group, Inc.

(57) ABSTRACT

An electronic device includes a main body, a display body, two adjustment assemblies, and a support assembly. The display body is movably positioned on the main body. Each adjustment assembly includes a guide shaft fixed on the main body, a slide member slidable relative to and along the guide shaft, and a rotary member. One end of the rotary member rotatably connects with the slide member, and the other end of the rotary member is rotatably connected to the display body. The support assembly is disposed on the main body to support and maintain the display at predetermined angles relative to the main body.

11 Claims, 6 Drawing Sheets

U.S. PATENT DOCUMENTS

| | | | |
|---|---|---|---|
| 2008/0081505 A1* | 4/2008 | Ou et al. | 439/374 |
| 2008/0161075 A1* | 7/2008 | Kim et al. | 455/575.4 |
| 2008/0297995 A1* | 12/2008 | Lai | 361/680 |
| 2008/0304217 A1* | 12/2008 | Lai et al. | 361/681 |
| 2008/0304218 A1* | 12/2008 | Park et al. | 361/681 |
| 2009/0009949 A1* | 1/2009 | Lai et al. | 361/681 |
| 2009/0016002 A1* | 1/2009 | Lai et al. | 361/681 |
| 2009/0233659 A1* | 9/2009 | Ke et al. | 455/575.3 |
| 2009/0298558 A1* | 12/2009 | Hsu | 455/575.1 |
| 2011/0157819 A1* | 6/2011 | Xu | 361/679.55 |

* cited by examiner

SLIDER ELECTRONIC DEVICE

BACKGROUND

1. Technical Field

The present disclosure generally relates to an electronic device, and more particularly to a slider electronic device.

2. Description of Related Art

A commonly used portable electronic device such as a slider mobile phone, generally includes a main body and a display body slidably positioned on the main body such that the display body of the slider mobile phone is capable of being moved to expose or overshadow the main body. However, the oblique angle between the main body and the display body is not adjustable, which can cause inconvenience observing or manipulating the electronic device when laid on a support surface.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
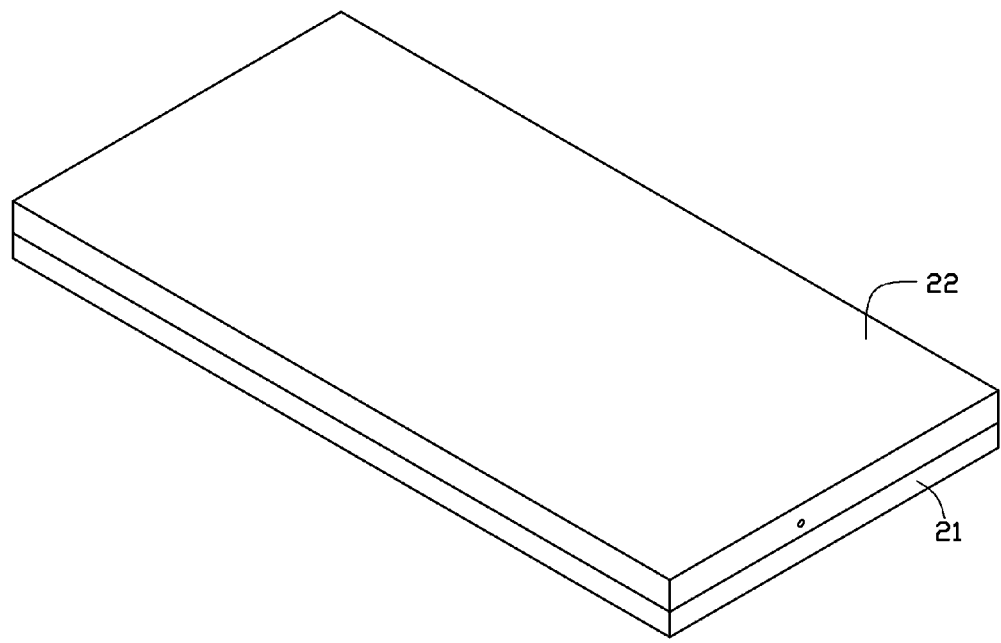
FIG. 1 is an assembled, isometric view of one embodiment of an electronic device, the electronic device including a main body, a display body, and a sub-cover.
Figure 2:
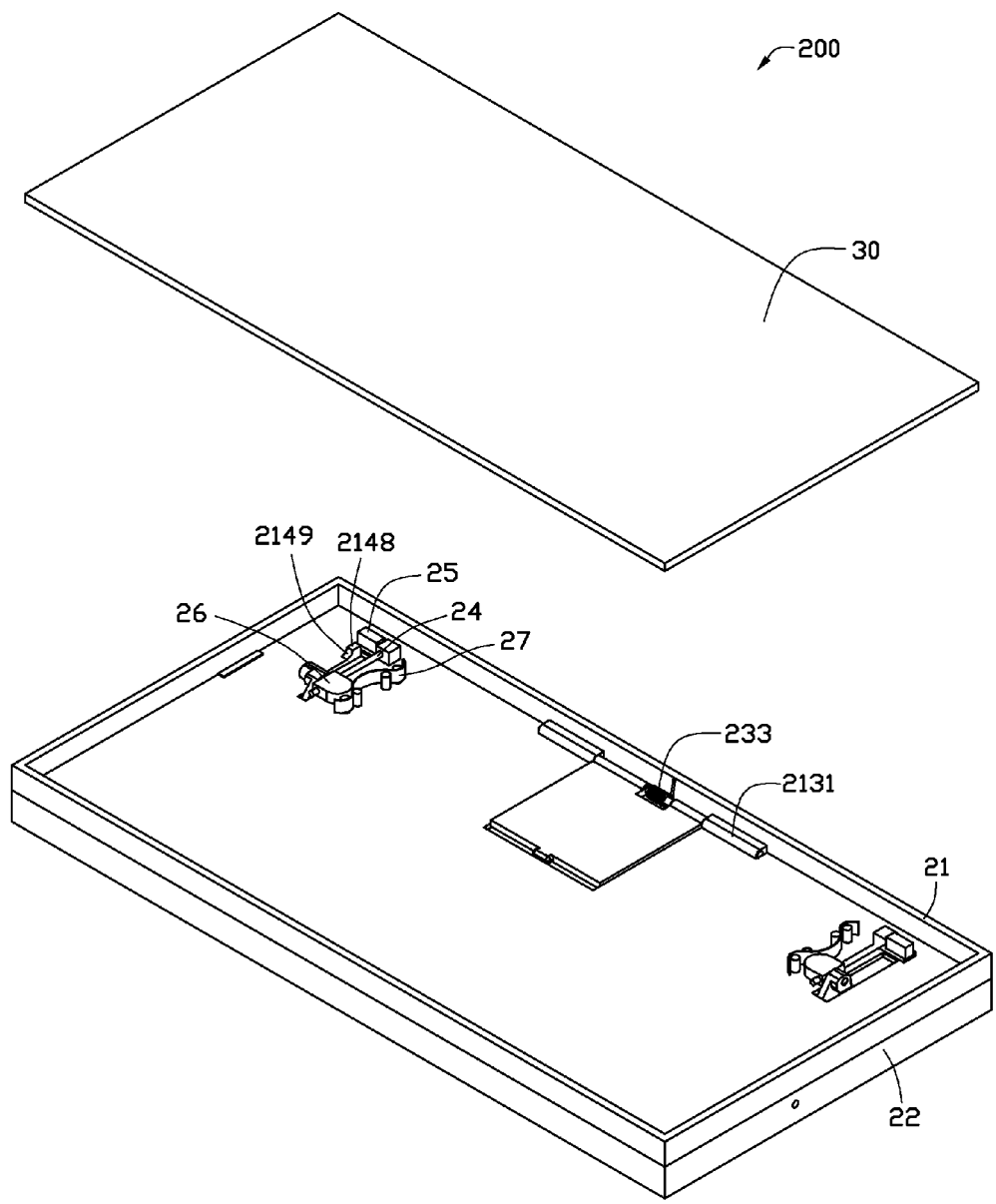
FIG. 2 is a partially exploded, isometric view of the electronic device of FIG. 1.
Figure 3:
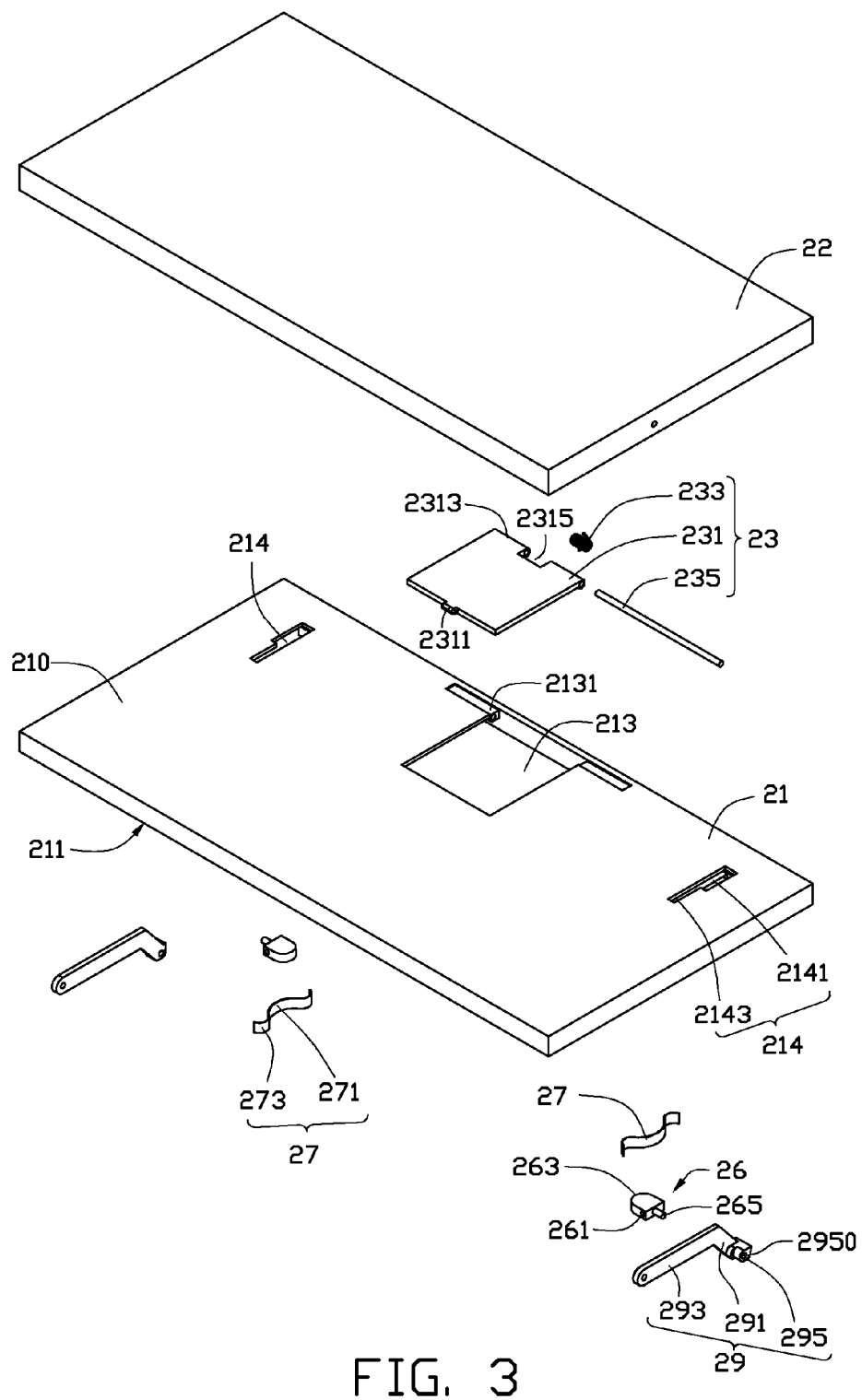
FIG. 3 is an exploded, isometric view of the electronic device of FIG. 1, without the sub-cover.
Figure 4:
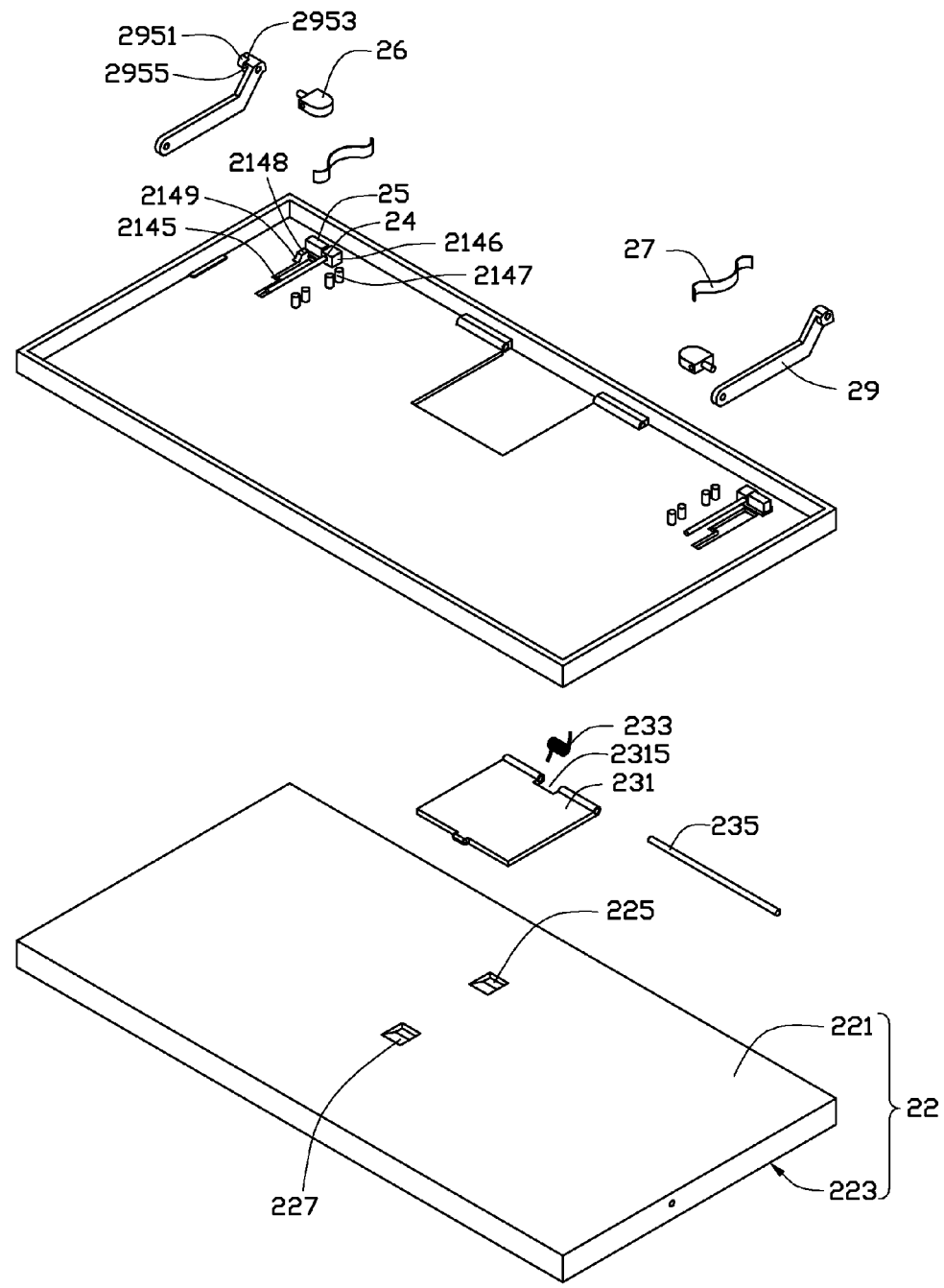
FIG. 4 is similar to FIG. 3, but viewed from another aspect.

Referring to FIGS. 1 through 4, one embodiment of an electronic device 200 includes a main body 21, a display body 22 movably positioned on the main body 21, a support assembly 23 positioned on the main body 21, two adjustment assemblies (not labeled) symmetrically positioned on the main body 21, and a sub-cover 30 covering the main body 21 to protect the main body 21.

The main body 21 can be substantially rectangular and includes a first surface 210 and a second surface 211 opposite to the first surface 210. The main body 21 defines a receiving space 213 for receiving the support assembly 23 therein and two slide grooves 214 adjacent to opposite sides of the main body 21. The receiving space 213 can be substantially rectangular, and the main body 21 further includes two sleeves 2131 adjacent to opposite sides of the receiving space 213. The slide grooves 214 of the main body 21 are substantially symmetrical in the main body 21 and substantially L-shaped. In the illustrated embodiment, the main body 21 may define one or more than two slide grooves 214.

Each slide groove 214 includes a sliding portion 2141 and a receiving portion 2143 communicating with the sliding portion 2141. The sliding portion 2141 is wider than the receiving portion 2143. A curved slide surface 2145 (referring to FIG. 6) is formed at an intersecting portion of the sliding portion 2141 and the receiving portion 2143. The main body 21 further includes two fixing members 2146, a plurality of fixing poles 2147, and two blocking protrusions 2148. One fixing member 2146, multiple fixing poles 2147, and one blocking protrusion 2148 are positioned adjacent to each slide groove 214. Specifically, the fixing member 2146 is adjacent to one end of the sliding portion 2141 of each slide groove 214, the fixing poles 2147 are adjacent to one side of each slide groove 214, and the blocking protrusion 2148 is adjacent to an opposite side of the slide groove 214. The blocking protrusion 2148 is positioned adjacent to the fixing member 2146. Each blocking protrusion 2148 forms a smooth curved impelling surface 2149 on one side thereof away form the corresponding fixing member 2146. In the illustrated embodiment, the main body 21 includes two pairs of fixing poles 2147 adjacent to each slide groove 214.

The display body 22 includes an engaging surface 221 and a latching surface 223 opposite to the engaging surface 221. The display body 22 forms a first location portion 225 and a second location portion 227 on the latching surface 223. In the illustrated embodiment, the first and second latching portions 225, 227 are protrusions. The display body 22 may form one or more than two latching portions.

The support assembly 23 includes a support board 231, a torsion spring 223, and a pivot shaft 235. The support board 231 forms a support portion 2311 at a first end (not labeled) and a sleeve portion 2313 at a second end (not labeled) opposite to the first end. The support board 231 defines a recess 2315 recessing from the second end. The support portion 2311 contacts the first latching portion 225 or the second latching portion 227 of the display body 22. In the illustrated embodiment, the support board 231 is substantially rectangular. Alternatively, the support board 231 may be substantially triangular, with the support portion 2311 formed at one vertex thereof and the sleeve portion 2313 on a side away from the vertex where the support portion 2311 is formed.

Each adjustment assembly includes a guide shaft 24, a magnetic member 25, a slide member 26, an elastic member 27, and a rotary member 29. The guide shaft 24 is fixed on the main body 21, the magnetic member 25 is adjacent to one end of the guide shaft 24, the slide member 26 is capable of sliding along the guide shaft 24, the elastic member 27 is disposed adjacent to and along the guide shaft 24, one end of the rotary member 29 is rotatably engaged with the slide member 26, and the other end of the rotary member 29 is connected to the display body 22.

The slide member 26 defines a sliding hole 261 for the guide shaft 24 to pass through. The slide member 26 forms a resisting portion 263 at one end and a pivot portion 265 at the other end thereof.

The elastic member 27 is substantially wave shaped and includes a curved portion 271 and two locking portions 273 at opposite ends of the curved portion 271.

The rotary member 29 is a bar and includes a connection portion 291, an extending portion 293 bending from one end of the connection portion 291, and a location portion 295 formed at the other end of the connection portion 295.

The location portion 295 defines a shaft hole 2950 corresponding to the pivot portion 265 of the slide member 26. The location portion 295 includes a curved engaging surface 2951 on one side, an attracting surface 2953 on the other side, and a flange 2955. The engaging surface 2951 is adjacent to the flange 2955 and corresponding to the impelling surface 2149 of the blocking protrusion 2148. The attracting surface 2953 is formed at one end of the flange 2955. In the illustrated embodiment, the location portion 295 is made of iron, and alternatively, the location portion 295 may be made of cobalt, nickel, or other materials but covered with iron, cobalt, or nickel.

During assembly of the electronic device 200, one adjustment assembly is assembled to the main body 21, and the other adjustment assembly is assembled to the main body in a similar manner.

The guide shaft 24 and the magnetic member 25 are fixed by the fixing member 2146 on the second surface 211 of the main body 21. The guide shaft 24 is positioned on one side of the slide groove 214 and is substantially perpendicular to the slide groove 214. The slide member 26 is sleeved on the guide shaft 24. The elastic member 27 is assembled to the main body 21 with the locking portions 273 thereof locked by two pairs of fixing poles 2147 of the main body 21, respectively. The curved portion 271 of the elastic member 27 is positioned to resist the slide member 26 such that an elastic force is exerted on the slide member 26. The pivot portion 265 of the slide member 26 passes through the shaft hole 2950 of the rotary member 29 such that the location portion 295 is rotatably connected to the slide member 26. The extending portion 293 passes through the slide groove 214 and is rotatably connected to the display body 22.

The support assembly 23 is capable of being received in the receiving space 213 of the main body 21, and the pivot shaft 235 passes through the sleeve portion 2313 of the support board 231 and the torsion spring 233, with two ends received in the sleeves 2131 of the main body 21 respectively. The torsion spring 233 is received in the recess 2315 of the support board 231 with one end thereof resisting the main body 21 and the other end thereof resisting a side wall (not labeled) of the recess 2315. When the torsion spring 233 is not deformed, the support board 231 is received in the receiving space 213 of the main body 21, and the support portion 2311 of the support board 231 resists a side wall of the receiving space 213. When the support board 231 is rotated relative to the main body 21, the torsion spring 233 is deformed and an elastic force is generated therein, such that the support board 231 has an inclination to rotate to be received in the receiving space 213 again.

Figure 5:
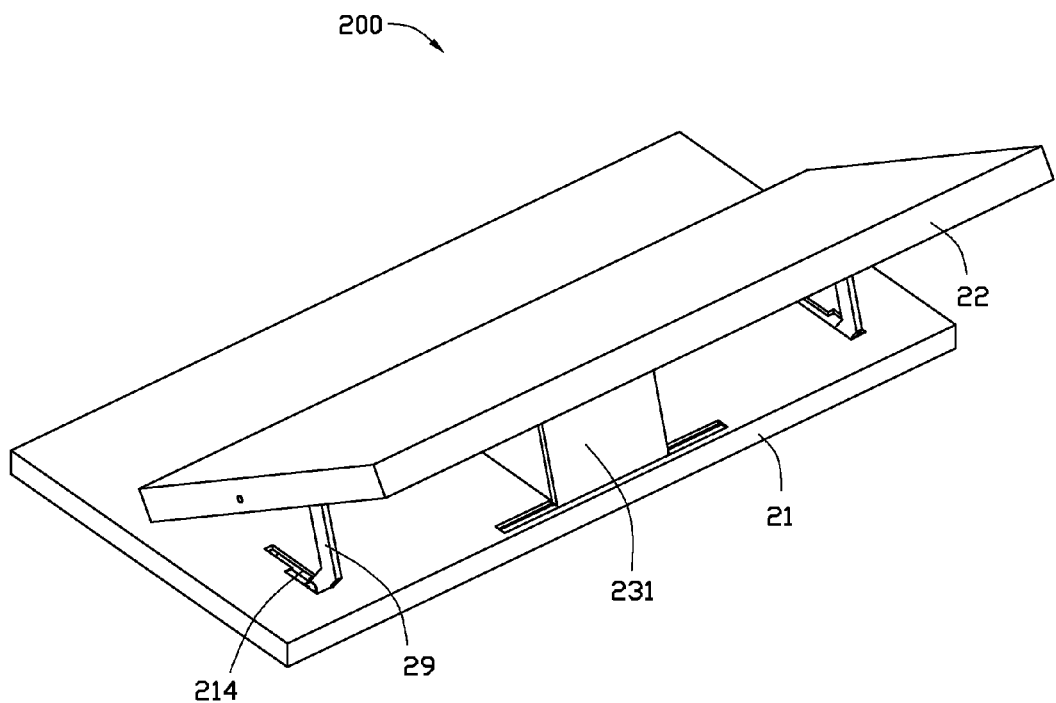
FIG. 5 is an assembled, isometric view of the electronic device of FIG. 1, showing the display body oblique relative to the main body.
Figure 6:
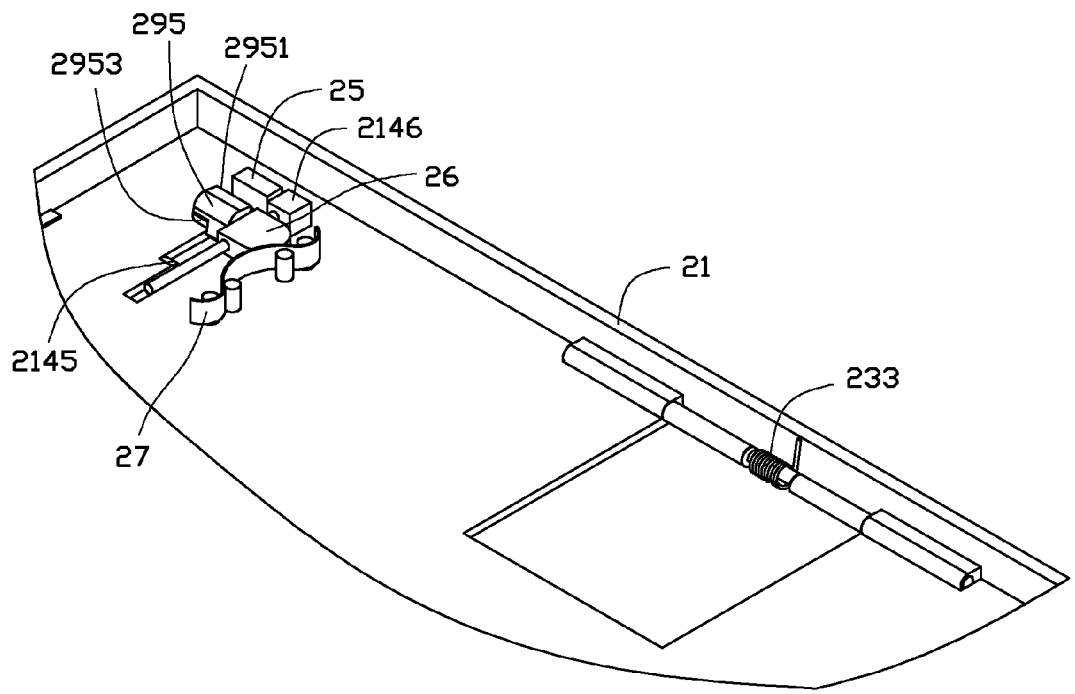
FIG. 6 is an assembled, partially enlarged view of the electronic device in the state of FIG. 5 without the sub-cover.

Also referring to FIGS. 5 and 6, when the display body 22 is covered on the main body 21, the extending portions 293 of the rotary members 29 are between the main body 21 and the display body 22, and the connection portions 291 of the rotary members 29 are received in the receiving portions 2143 of the slide grooves 214.

When the display body 22 is to rotate relative to the main body 21, the display body 22 is slid. Because the slide members 26 are connected to the rotary members 29 and the rotary members 29 are connected to the display body 22, the slide members 26 slide with the display body 22 along the guide shaft 24 towards the magnetic members 25. The slide members 26 are slid until the engaging surfaces 2951 of the location portions 295 resist the impelling surfaces 2149 of the blocking protrusions 2148. Therefore, the rotation of the rotary members 29 is facilitated by the engagement of the engaging surfaces 2951 and the impelling surfaces 2149. The location portions 295 of the rotary members 29 are rotatably received in the sliding portions 2141 of the slide grooves 214, and the flanges 2955 of the rotary members 29 are blocked by the blocking protrusions 2148 of the main body 21. The magnetic members 25 absorb the attracting surfaces 2953, such that the location portions 295 of the rotary members 29 are maintained at predetermined angles.

The support board 231 of the support assembly 23 is rotated and the support portion 2311 contacts the first latching portion 225 such that the display body 22 is securely maintained at the predetermined angle. The torsion spring 233 of the support assembly 23 is deformed. If the oblique angle of the display body 22 relative to the main body 21 is to be altered, the support board 231 can be rotated to resist the display body 22 with the support portion 2311 contacting the second latching portion 227. If the display body 22 is required to cover on the main body 21, the display body 22 is rotated to disengage from the support board 231, and therefore the support board 231 rotates to be received in the receiving space 213 of the main body 21 again automatically and the elastic force disappears gradually. A rotation force is exerted on the rotary members 29 to disengage the location portions 295 thereof from the magnetic members 25 and rotate in the sliding portions 2141 of the slide groove 214. At the same time, the slide members 26 are slid away from the magnetic members 25 along the guide shafts 24. The resisting portions 263 of the slide members 26 resist the curved portions 271 of the elastic member 27 and the location portions 295 of the rotary members 29 are slid towards the receiving portions 2143 of the slide grooves 214 by the resisting portions 263. Therefore, the display body 22 resumes covering the main body 21. Because the slide members 26 resist the curved portions 271 of the elastic members 27 while sliding along the guide shafts 24, vibration of the slide members 26 is generated providing tactile feedback.

Because the display body 22 of the electronic device 200 is rotatable to predetermined angles relative to the main body 21, viewing angles of the display body 22 even on a support surface are conveniently variable.

Alternatively, the electronic device 200 may include one or more than two adjustment assemblies. The elastic member 27 of each adjustment assembly and the fixing poles 2147 of the main body 21 are omitted correspondingly. The torsion spring 233 of the support assembly 23 may be omitted, and the support board 231 rotated by external force.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a main body defining at least one slide groove and comprising a first surface and a second surface opposite to the first surface;
   a display body movably positioned on the main body;
   at least one adjustment assembly comprising a guide shaft fixed on the main body, a slide member slidably relative to and along the guide shaft, and a rotary member with one end rotatably engaged with the slide member and the other end rotatably connected to the display body, the guide shaft and the slide member contacting the second surface, and the rotary member passing through the at least one slide groove and connected to the display body; and
   a support assembly positioned on the main body, the support assembly supporting the display body to maintain the display body at predetermined angles relative to the main body,
   wherein the main body forms at least one fixing member to fix the guide shaft on the second surface of the main body, and the fixing member is positioned adjacent to one end of the slide groove.

2. The electronic device of claim 1, wherein the at least one adjustment assembly further comprises a magnetic member connected to the fixing member, and the rotary member comprises an attracting surface to absorb the magnetic member when the rotary member rotates to the predetermined angles and holds the rotary member relative to the main body.

3. The electronic device of claim 2, wherein the rotary member comprises a location portion and the attracting surface is formed on one side of the location portion, the location portion forms a flange, and the main body forms at least one blocking protrusion adjacent to one side of the at least one slide groove to limit a movement range of the flange.

4. The electronic device of claim 3, wherein the at least one blocking protrusion comprises an impelling surface which is curved, and the location portion of the rotary member comprises an engaging surface corresponding to the impelling surface of the at least one blocking protrusion.

5. The electronic device of claim 4, wherein the at least one slide groove comprises a sliding portion adjacent to the fixing member and a receiving portion away from the fixing member.

6. The electronic device of claim 1, further comprises at least one elastic member adjacent to one side of the at least one slide groove, and the at least one elastic member resists the slide member of the at least one adjustment assembly.

7. The electronic device of claim 1, wherein the support assembly comprises a support board, a torsion spring, and a pivot shaft; the support board comprises a sleeve portion at one end, the sleeve portion of the support board and the torsion spring are sleeved on the pivot shaft, one end of the torsion spring resists the support board, and the other end of the torsion spring resists the main body.

8. The electronic device of claim 7, wherein the support board comprises a support portion at another end away from the sleeve portion, and the display body forms at least one latching portion contacting the support portion.

9. The electronic device of claim 8, wherein the support portion is a protrusion formed on the support board, and the at least one latching portion is a plurality of protrusions formed on one side of the display body.

10. The electronic device of claim 9, wherein the display body forms two latching portions.

11. The electronic device of claim 1, wherein the electronic device comprises two adjustment assemblies symmetrically disposed on the main body.

* * * * *